United States Patent [19]

Compri

[11] Patent Number: 4,922,813
[45] Date of Patent: May 8, 1990

[54] LOW COST QUICK INSERT CITRUS STRAINER TUBE

[75] Inventor: Joel Compri, Sao Geraldo-Araraquara, Brazil

[73] Assignee: FMC Corporation, Chicago, Ill.

[21] Appl. No.: 305,355

[22] Filed: Feb. 2, 1989

[51] Int. Cl.$^5$ ............................ A23N 1/02; B30B 9/02
[52] U.S. Cl. ........................................ 99/510; 99/495; 100/98 R; 100/108; 100/213
[58] Field of Search ............... 99/495, 509, 510, 513; 100/37, 98 R, 104, 108, 117, 127, 213; 210/460, 169, 315

[56] References Cited

U.S. PATENT DOCUMENTS

| | | |
|---|---|---|
| 3,236,175 | 2/1966 | Belk ..................................... 100/108 |
| 3,736,865 | 6/1973 | Hait ................................. 100/213 X |
| 3,866,528 | 2/1975 | Montagroni ......................... 99/495 |
| 4,309,943 | 1/1982 | Larsen et al. ......................... 99/509 |
| 4,700,620 | 10/1987 | Cross ..................................... 99/510 |

Primary Examiner—Timothy F. Simone
Attorney, Agent, or Firm—Lloyd B. Guernsey; R. C. Kamp

[57] ABSTRACT

A low-cost strainer tube which can be quickly replaced in a citrus fruit juice extractor. The tube includes a hollow perforated sleeve which can be quickly inserted into a hollow body member and can be quickly removed. The sleeve has a plurality of groups of radial perforations which align with corresponding radial holes in the body member to allow juice to flow from an inside of the sleeve to an outside of the body member. To the amount of pulp which flows through the perforations it is necessary to remove only the sleeve and substitute another sleeve with different size perforations.

8 Claims, 2 Drawing Sheets

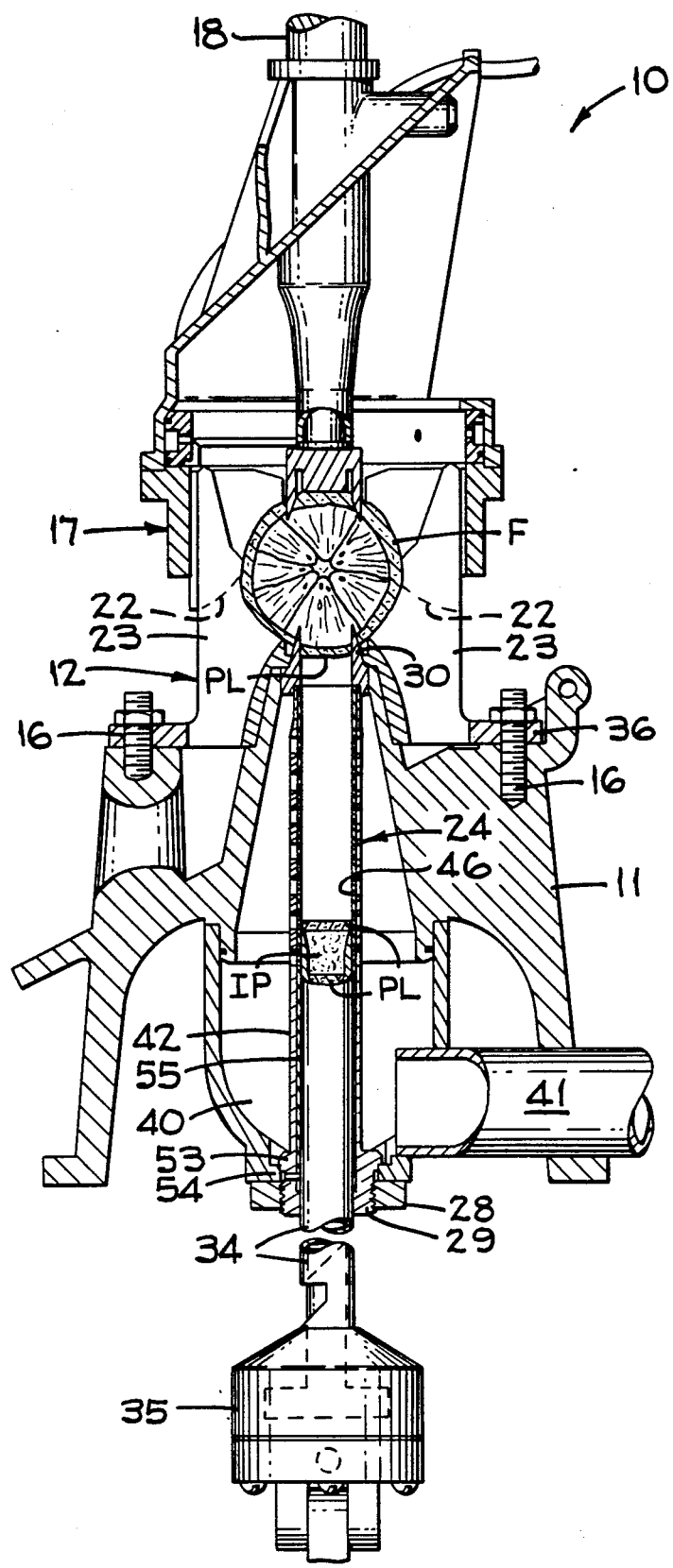
FIG_1

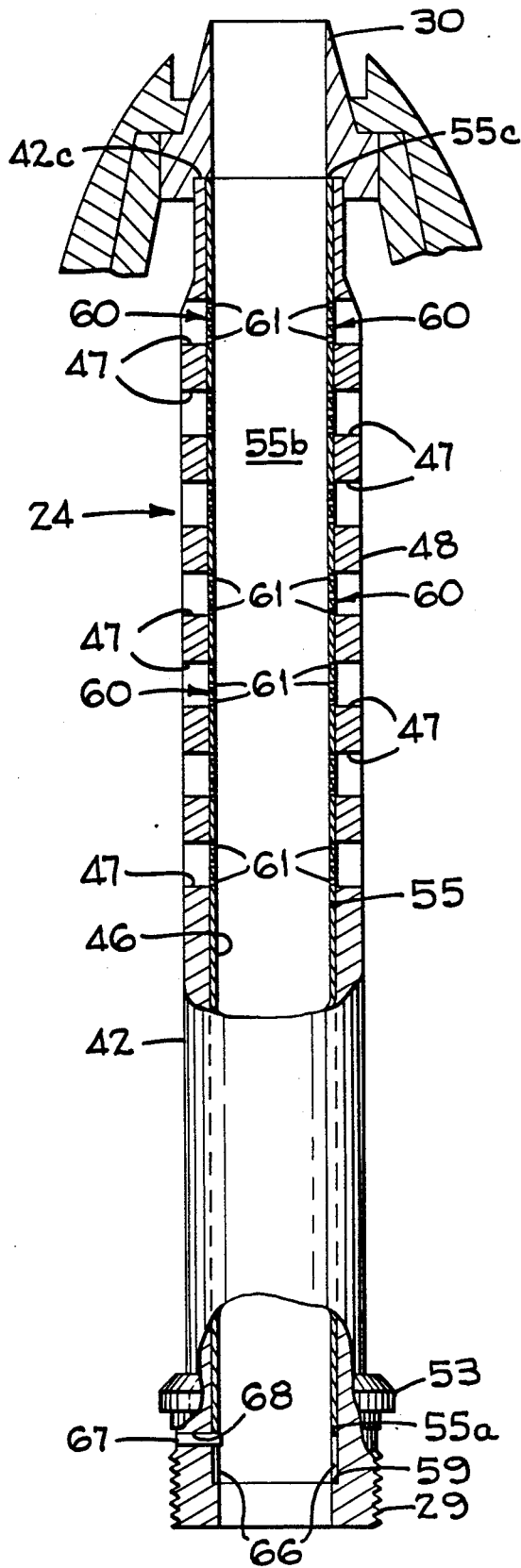
FIG_2
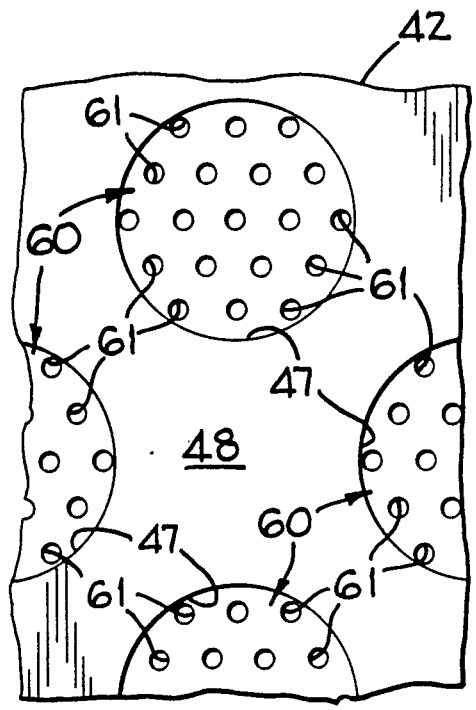
FIG_3
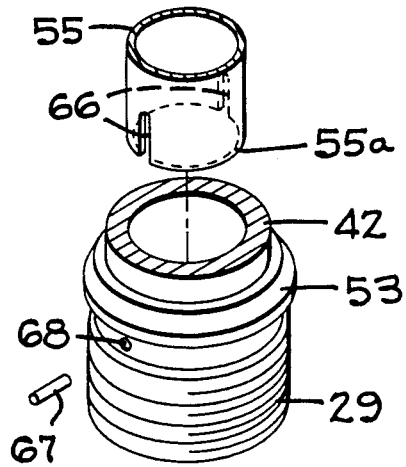
FIG_4

LOW COST QUICK INSERT CITRUS STRAINER TUBE

BACKGROUND OF THE INVENTION

The present invention generally relates to apparatus for extracting juice from fruit, and more particularly, to an improved low-cost strainer tube for use in juice extractors.

The complete commercial processing of citrus fruit to obtain juice therefrom today includes the dejuicing and discharging of the pulp and internal membranes of the fruit, the breaking up and ejecting of the peel, the extracting and collecting of the peeled oil, and the separate extracting and collecting of the fruit juice.

In a typical extractor a whole unpeeled citrus fruit is placed between two cups, each of which is formed by a plurality of circumferentially spaced fingers and one of which is provided with a passage to allow discharge of juice and pulp from the fruit. The fingers of the upper and lower cup are arranged in an interdigitating relationship so that as cups are brought together, the cavity between the cups is progressively reduced to squeeze juice from fruit within the cavity. The peel of the fruit is shredded and ejected through an annular opening adjacent to the upper central portion of the upper cup. The juice-bearing material of the fruit is forced downwardly through the passage in the lower cup and into a perforated strainer tube which communicates with the lower cup. As the fruit is squeezed between the cups, an orifice tube is forced upwardly within the strainer tube to exert pressure on the juice-bearing material within the strainer tube to express the raw juice through the perforations therein. The raw juice expressed through the strainer tube is collected within a sump or manifold which extends transversely of the machine through the lower cup assemblies.

The movement of the orifice tube within the strainer tube and squeezing of juice through the perforations cause wearing of the strainer tube which is expensive to replace both because of the cost of the manufacturing of the tube and of the time required in replacing the tube.

SUMMARY OF THE INVENTION

The present invention discloses a strainer tube which is relatively inexpensive to manufacture and can be quickly replaced. The strainer tube is made in two parts with an inexpensive hollow perforated sleeve being mounted inside a generally cylindrical body member having an axially extending bore. The body member includes a plurality of holes which extend radially outward from the actual bore. The hollow sleeve includes a plurality of groups of perforations with each of the groups of perforations being positioned adjacent to a corresponding one of the body member holes so juice can move axially outward from an end side of the hollow sleeve through the perforations and through the body member holes to an outer portion of the body member.

BRIEF DESCRIPTION OF THE DRAWINGS

FIG. 1 is a fragmentary vertical section through a portion of a fruit juice extractor in which the strainer tube of the present invention can be used.

FIG. 2 is a side elevation, partly in section of a strainer tube of the present invention.

FIG. 3 is an enlarged side elevation of a portion of the strainer tube of FIG. 2.

FIG. 4 is an isometric of a lower portion of the strainer tube of FIG. 2.

DESCRIPTION OF THE PREFERRED EMBODIMENT

A portion of a citrus juice extractor 10 in which the present invention can be used is shown in FIG. 1. Extractor 10 includes a bed plate 11 having a lower cup 12 rigidly connected thereto by a plurality of stud bolts 16. An upper cup assembly 17 is mounted on the lower end of a drive rod 18 above cup 12 so that the upper cup can be moved directly downwardly to engage fruit disposed in the lower cup. The drive rod 18 is secured at its upper end to a drive mechanism (not shown) which provides vertical reciprocal movement. A plurality of upper cup fingers 22 are mounted on the lower end of drive rod 18 to form an interdigitating fruit cup with a plurality of lower cup fingers 23. A strainer tube 24 of the present invention is vertically secured to bed plate 11 by a nut 28 which is threaded on a lower threaded end portion 29 of tube 24. An upper end of strainer tube 24 is rigidly mounted to an annular cutter 30 which, in turn, is fixed to bed plate 11. A tubular plunger 34 slides within strainer tube 24 powered by a drive assembly 35 attached to the lower end of plunger 34.

After a fruit F is deposited in the lower cup 12 the associated upper cup and assembly 17 is moved downwardly to engage the fruit. At the same time plunger 34 below the cup is raised within strainer tube 24 in timed relationship with the lowering of the upper cup assembly.

The lower cup 12 comprises a plurality of equally spaced, upstanding fingers 23 that extend upwardly from a hub portion 36. The upper cup and the upper cup assembly 17 is comprised of similar equally spaced downwardly depending fingers 22. The fingers 22 of the upper cup are arranged in an interdigitating relationship with the fingers 23 of the lower cup so when the cup assemblies are brought together, the lower ends of the upper fingers and the upper ends of the lower fingers are received in spaces between the fingers to form a generally spherical pocket in the center of the cup assemblies to receive the fruit F. The pocket is then progressively contracted as the cup assemblies are moved together.

Generally, the contracting of the cavity between a pair of upper and lower cups first causes a plug PL (FIG. 1) to be cut from the underside of the fruit, and thereafter the cavity is reduced to the point where all of the juice and other solid internal portions IP of the fruit are forced into the strainer tube 24. Such solid internal portions IP included membranes, juice sacs, seeds, etc. Simultaneously therewith, plunger tube 34 is moved upwardly. A series of plugs PL and internal fruit portions IP removed from the previously processed fruits are engaged in the bore of the plunger, such plugs and materials prevent the juice within strainer tube 24 from egressing through the passage in the tubular plunger. As the plunger moves upwardly, juice and internal portions that are forced into the strainer tube by the compressing force of the cups upon the fruit will be placed under increasing pressure to force the juice and some minute particle solid material, such as juice sacs or pieces of membranes, outward through apertures in the strainer tube. The discharged juice and minute solid material is collected within a manifold 40 and discharged through a conduit 41.

Details of strainer tube 24 of the present invention are disclosed in FIGS. 2-4. Tube 24 includes a hollow cylindrical body member 42 having an axial bore 46 extending through the length of body member 42. A plurality of holes 47 extend radially outward from bore 46 to an outer portion 48 of body member 42. An outwardly projecting flange 53 and nut 28 on the threaded end portion 29 (FIG. 1) secure body member 42 to a bottom wall 54 (FIG. 1) of manifold 40.

A hollow perforated sleeve 55 is mounted inside bore 46 of body member 42 with a lower end 55a against a shoulder 59 in body member 42. A plurality of groups 60 of perforations 61 are formed in the wall of hollow sleeve 55 with each of groups 60 being mounted adjacent to a corresponding one of the holes 47 in body member 42 (FIGS. 2, 3). This allows juice to flow from an inside 55b of hollow sleeve 55 out through perforations 61 and through hole 47 to the outside of body member 42. A slot 66 (FIGS. 2, 4) in the lower end portion of hollow sleeve 55 fits around a pin 67 mounted in a bore 68 in the lower end portion of body member 42 to insure that each of the perforation groups 60 are properly aligned with a corresponding hole 47. Annular cutter 30 (FIGS. 1, 2) is positioned about upper end portions 42c, 55c of body member 42 and sleeve 55 to secure hollow screen 55 securely in place in juice extractor 10.

The cost of manufacture of hollow sleeve 55 is relatively low because only the areas adjacent to holes 47 of body member 42 have perforations 61 formed in sleeve 55. The cost of making sleeve 55 is also relatively low because the walls can be fairly thin as the walls of body member 42 reinforces sleeve 55. Changing sleeves 55, because of wear or because different sized perforations are desired, is relatively easy. Cutter 30 is removed and sleeve 55 is pushed upward out of body member 2 and another sleeve is pushed downward into place It is not necessary to remove body member 42 from the extractor.

Thus, the cost of manufacture and cost of changing sleeves is much lower than the cost of similar operations in a single-piece type of strainer tube.

Although the best mode contemplated for carrying out the present invention has been herein shown and described, it will be apparent that modification and variation may be made without departing from what is regarded to be the subject matter of the invention.

What is claimed is:

1. A low-cost quick insert strainer tube for use in a citrus fruit juice extractor, said tube comprising:
   a generally cylindrical body member having an axial bore extending through said body member, a plurality of holes extending radially outward from said bore to an outer portion of said body member, and a connector end portion thereof for connecting said body member to said juice extractor;
   a hollow perforated sleeve for slidable and close-fitting insertion into a portion of said axial bore in said body member to be radially supported thereby, said sleeve having a plurality of groups of radially extending perforations, said perforations each having a size smaller than said body member holes with each of said groups of perforations being positioned adjacent to a corresponding one of said body member holes so juice can move radially outward from inside of said hollow sleeve through said perforations in said hollow sleeve and through said body member holes to said outer portion of said body member; and,
   means for releasably securing said hollow sleeve to said body member in an aligned orientation inside said bore of said body member to insure alignment of said perforations with said holes, and to permit ready removal from and replacement of said sleeve within said body member when desired.

2. A low-cost strainer tube as defined in claim 1 including a shoulder adjacent to said axial bore and adjacent to said connector end portion of said body member, said shoulder providing an orientation stop for positioning said sleeve to align said groups of perforations in said sleeve with said body member holes.

3. A low-cost strainer tube as defined in claim 1 including a quick release mechanism for releasably securing said perforated sleeve in said bore of said body member and for facilitating removal of said perforated sleeve from said body member while retaining said body member in an operating position in said juice extractor.

4. A low-cost strainer tube as defined in claim 1 wherein said connector end portion of said body member includes a plurality of threads for connection to said juice extractor.

5. A low-cost strainer tube as defined in claim 1 wherein said perforated sleeve includes a slot in an end portion and said body member includes a pin for mating with said slot to orient said sleeve with said body member to insure that said groups of perforations in said sleeve are aligned with said holes in said body member.

6. A low-cost strainer tube as defined in claim 1 wherein said perforated sleeve is comprised of relatively thin material and said body member is comprised of thicker material to reinforce said perforated sleeve.

7. In a juice extractor having means for compressing a fruit to extract juice therefrom, a hollow strainer tube therebeneath to receive the juice including a cylindrical body member having an axial bore and a plurality of radially extending holes therethrough through which juice can flow radially outwardly, and a plunger tube mounted for movement within said body member to coact with the said compressing means in extracting the juice,
   the improvement in said strainer tube thereof comprising a relatively thin hollow sleeve slidably, snugly and detachably received within said body member so as to be radially supported thereby, said sleeve having a plurality of groups of perforations aligned with said body member holes, with said perforations being of smaller size than said holes whereby juice may be expressed radially outwardly through said perforations and said holes while generally retaining pulp within said sleeve,
   whereby said sleeve may be removed from said body member for repair or replacement when desired without disassembling said tubular body member from said juice extractor.

8. The improved juice extractor of claim 7 wherein said hollow sleeve and said body member include cooperating pin and slot means to orient said sleeve with respect to said body member to insure proper alignment of said groups of perforations with said holes.

* * * * *